(12) United States Patent
LeBegue

(10) Patent No.: US 6,371,255 B1
(45) Date of Patent: Apr. 16, 2002

(54) SPRING APPLIED HYDRAULIC RELEASE BRAKE

(75) Inventor: Maurice K. LeBegue, Bluefield, WV (US)

(73) Assignee: Eimco LLC, Bluefield, WV (US)

( * ) Notice: Subject to any disclaimer, the term of this patent is extended or adjusted under 35 U.S.C. 154(b) by 0 days.

(21) Appl. No.: 09/304,153

(22) Filed: May 3, 1999

(51) Int. Cl.[7] .......................... F16D 55/02; F16H 57/10
(52) U.S. Cl. .............. 188/72.1; 188/264 F; 188/264 D; 188/170; 475/346; 475/900
(58) Field of Search .................................. 475/900, 140, 475/346; 188/264 D, 264 F, 264 CC, 264 P, 170, 72.1

(56) References Cited

U.S. PATENT DOCUMENTS

| | | | | |
|---|---|---|---|---|
| 2,953,040 A | * | 9/1960 | Christenson et al. .......... 74/781 |
| 3,578,818 A | | 5/1971 | Eastcott ........................ 303/16 |
| 3,800,901 A | * | 4/1974 | Blomstrom et al. ....... 180/9.62 |
| 4,018,140 A | | 4/1977 | Engle ............................ 92/31 |
| 4,037,694 A | * | 7/1977 | Keese ......................... 192/4 A |
| 4,077,500 A | | 3/1978 | Hickman, Sr. et al. .. 188/106 P |
| 4,142,615 A | * | 3/1979 | Sidles, Jr. et al. .......... 192/4 A |
| 4,160,497 A | * | 7/1979 | Galicher ..................... 192/4 A |
| 4,196,798 A | | 4/1980 | Barsted ...................... 192/3 N |
| 4,406,354 A | | 9/1983 | Barsted ...................... 192/3 N |
| 4,461,373 A | * | 7/1984 | Pratt et al. .................. 192/4 A |
| 4,604,915 A | * | 8/1986 | Soffge et al. ................. 74/790 |
| 4,625,837 A | | 12/1986 | Zimmer ....................... 188/170 |
| 4,633,984 A | * | 1/1987 | Hudson .......................... 192/9 |
| 4,646,880 A | * | 3/1987 | Logan ....................... 188/18 A |
| 4,655,326 A | * | 4/1987 | Osenbaugh ............... 188/18 A |
| 4,667,784 A | | 5/1987 | Cronin ........................ 192/4 A |
| 4,893,879 A | | 1/1990 | Middelhoven et al. ......... 303/71 |
| 4,989,703 A | | 2/1991 | Forsyth et al. .............. 192/4 A |
| 5,087,227 A | * | 2/1992 | Giere et al. ................... 475/72 |
| 5,190,123 A | | 3/1993 | Hvolka ....................... 188/71.6 |
| 5,743,824 A | * | 4/1998 | Park ........................... 475/276 |

\* cited by examiner

Primary Examiner—Christopher P. Schwartz
Assistant Examiner—Melody M. Burch
(74) Attorney, Agent, or Firm—Burns, Doane, Swecker & Mathis, L.L.P.

(57) ABSTRACT

A prime mover of an underground mining machine is propelled by motor driven endless tracks that are operated in unison or independently to effect forward and reverse movement of the machine and turning of the machine. Drive is transferred to each track from a motor mounted in a traction case on each side of the machine to an input shaft through first and second stage planetary assemblies to a sprocket assembly that rotatably supports the respective tracks. A planetary carrier of the first stage planetary assembly is longitudinally movable under a spring force to apply a braking force through a brake disc to a brake plate extending from the input shaft. Fluid pressure in the traction case opposes the spring force to normally maintain the planetary carrier removed from braking engagement with the brake disc. In the event the fluid pressure drops below a preselected level, the spring force moves the planetary carrier longitudinally to actuate the brake disc assembly to interrupt rotation of the input shaft and brake the vehicle.

20 Claims, 15 Drawing Sheets

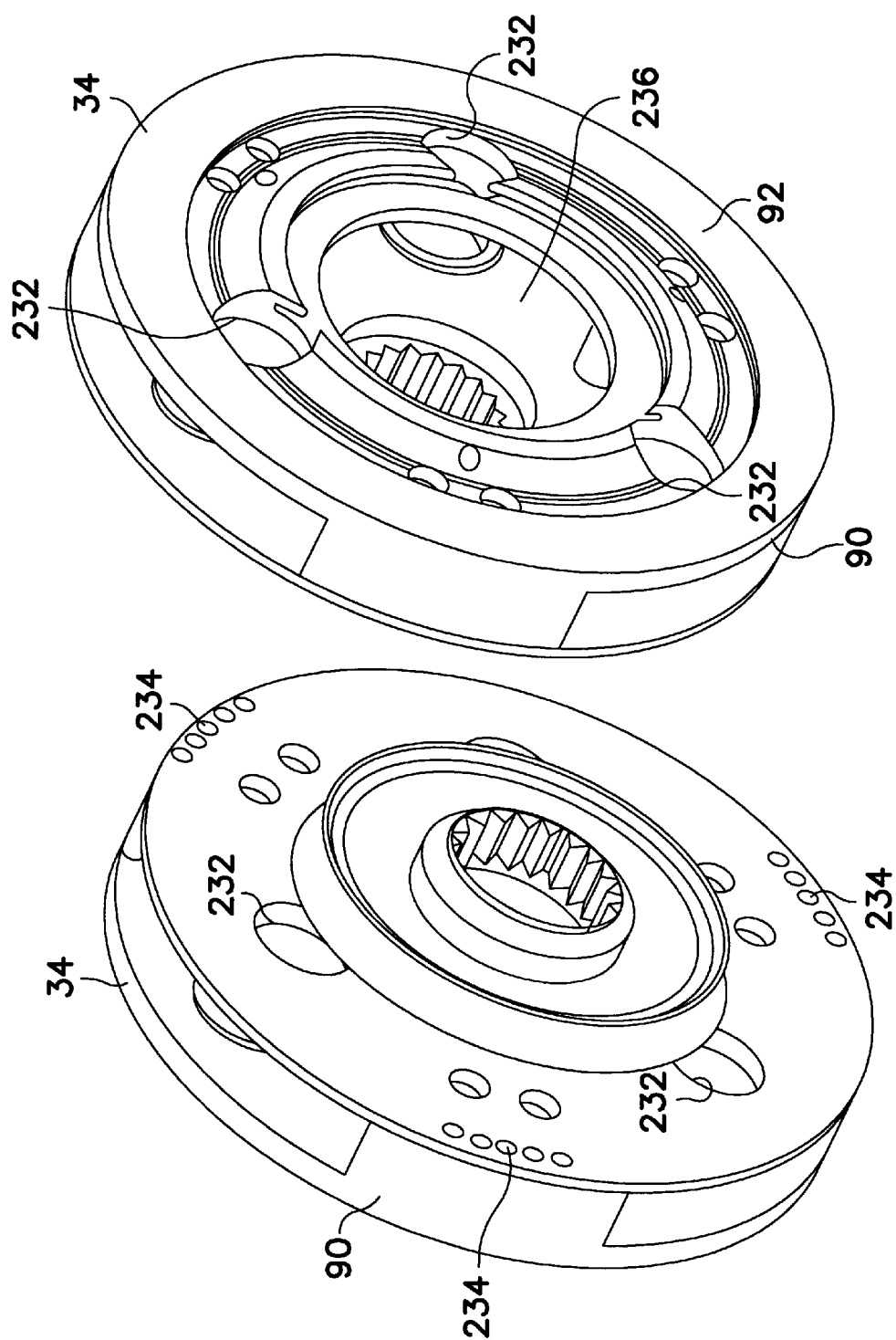

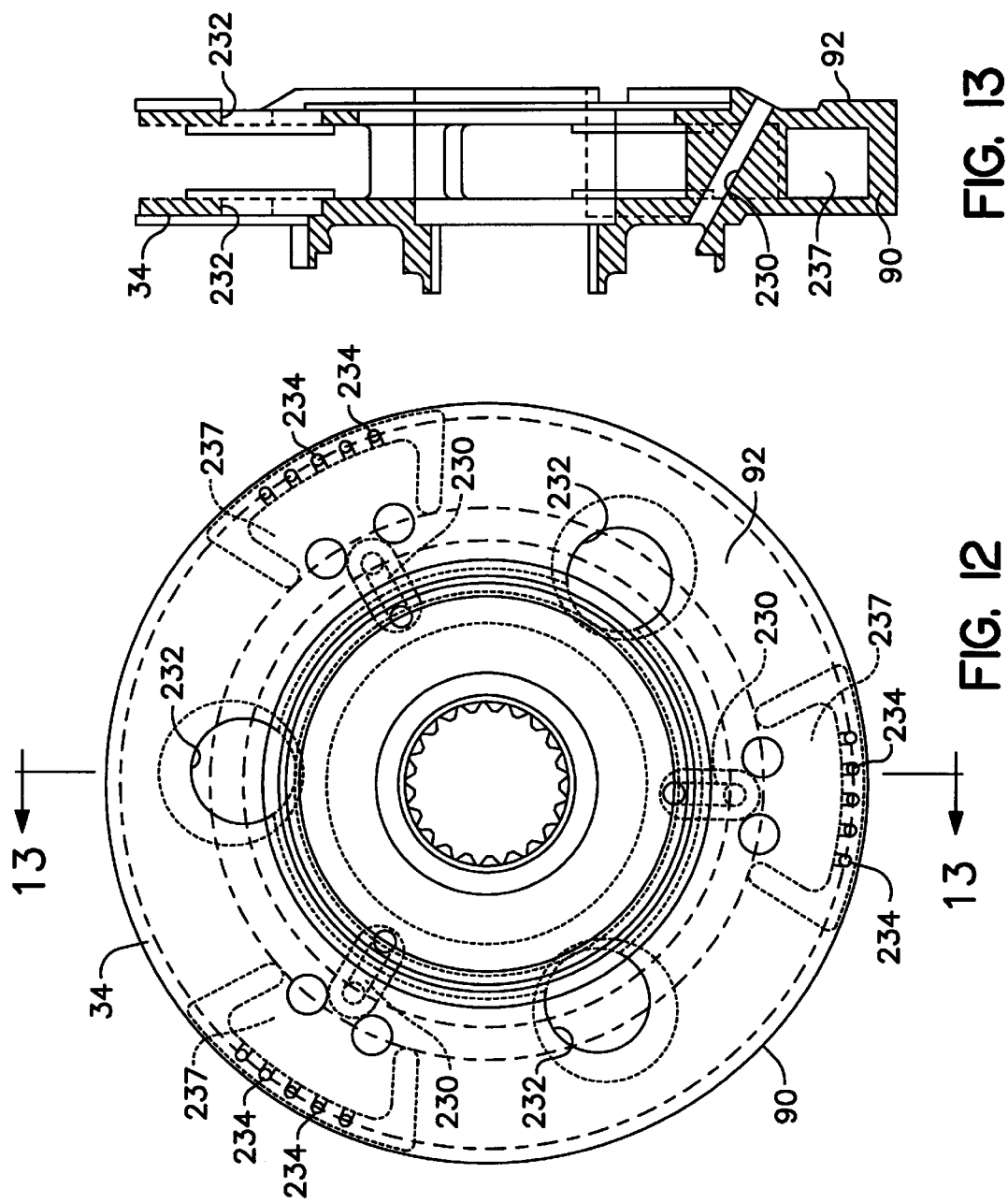

SPRING APPLIED HYDRAULIC RELEASE BRAKE

BACKGROUND OF THE INVENTION

1. Field of the Invention

This invention relates to method and apparatus for braking a wheeled or tracked vehicle and, more particularly, to method and apparatus for implementing a braking force on an intermediate, interior portion of a drive train of an underground mining vehicle to brake the vehicle.

2. Description of the Prior Art

Fluid applied braking systems are well known in the art of wheeled and tracked vehicles. However, in some instances it is desirable for a braking system to include a fail-safe mechanism whereby loss of power to the vehicle or loss of hydraulic fluid pressure to the braking assembly actuates the braking assembly to engage and stop the vehicle. Several examples of known fail-safe braking systems are disclosed in U.S. Pat. Nos. 4,077,500; 4,667,784; 4,018,140; 4,893,879; 5,190,123; and 4,989,703. Other examples of brake equipment specifically adapted for underground mining machinery are disclosed in U.S. Pat. Nos. 3,578,818; 4,196,798; and 4,406,354.

U.S. Pat. Nos. 4,077,500 and 4,667,784 disclose a piston brake arrangement for applying emergency or parking braking pressure to a vehicle axle. In this brake arrangement, a brake piston is urged by a spring into contact with a series of brake discs and plates to apply a braking force to the vehicle wheel hub. During normal movement of the vehicle, hydraulic pressure is maintained to counteract the spring pressure applying the brake. The pressurized fluid biases the springs and prevents them from exerting pressure on the brake piston.

In the event of a loss in fluid pressure or the need for additional braking power, the hydraulic fluid in the brake is vented. The full force of the springs is exerted against the brake piston. In this manner additional stopping power is provided even when the vehicle is not in operation.

U.S. Pat. No. 4,018,140 discloses a system for braking a railed vehicle which is spring applied in a fail-safe manner and can only be disengaged upon pressurization of the system with an appropriate amount of hydraulic fluid. Also, once the fail-safe brake is engaged, if hydraulic pressure cannot be obtained, the fail-safe mechanism can be overcome by manually retracting the spring to allow the vehicle to move.

U.S. Pat. No. 4,893,879 discloses a fail-safe braking system. A wheel is connected by a hub to a rotatable axle and is stopped by operation of the relatively nonrotatable wheel brake. Conventionally in heavy duty materials handling machinery the braking system includes a housing having a wet pack of brake discs and plates. Cooling fluid is packed around the discs and plates to keep them cool during application of the brakes.

A brake piston is axially movable by a set of springs in the housing to engage the brake pack to stop the wheel from rotating. Hydraulic fluid is controllably injected into a chamber positioned opposite the brake piston. Depending upon the amount of fluid injected into the chamber, the braking pressure of the piston is correspondingly reduced. Under normal operation, sufficient fluid is injected to allow the wheel to rotate freely. However, upon application of a foot pedal or loss of fluid pressure in the system, the pressure in the chamber is reduced, causing the springs to force the brake piston into engagement with the brake pack, thereby stopping the vehicle.

U.S. Pat. No. 5,190,123 discloses a fail-safe braking system located in the wheel hub of a vehicle. The braking system includes a spring brake which can be manually engaged or which engages automatically upon a predetermined drop in hydraulic pressure. The walls of the wheel hub define a hub reservoir surrounding the brake components in which hydraulic fluid or oil is circulated to keep the traditional brake plate/disc pack cool during application of the brakes. Initially, a mechanical spring forces the brake components into engagement. Only application of sufficient hydraulic pressure counters the spring and permits the wheel hub to rotate.

U.S. Pat. No. 4,625,837 discloses a pressurized release braking system. A rotating brake disc is restrained from movement by a pair of non-rotatable braking elements acting against the disc. A sealed chamber is formed between the braking elements and is used to release the braking mechanism. Initially, the braking elements are forced against the disc by a series of regularly positioned spring packs. The spring packs exert a constant pressure against the braking elements and the disc, unless opposed.

In the event that movement of the disc is required, a fluid (typically air) is forced into the chamber between the braking elements. The air is injected at such a pressure to counterbalance the effect of the spring packs and force the braking elements to release the disc. Upon venting of the chamber, the braking elements once again act upon the disc, restraining movement.

While each of the above fail-safe braking assemblies have proved to be effective, it has been found in certain circumstances that a braking system acting upon a vehicle drive axle is ineffective, whether due to spatial constraints or other mechanical considerations. Also, it has been found that, although brake assemblies need a certain amount of lubrication to function efficiently, an excess volume of lubrication can cause reduced vehicle performance during non-braking operations.

Therefore, there is a need for a braking system that applies a braking force on an intermediate portion of a vehicle drive train, removed from the vehicle drive axle.

There is further need for a manual disengagement assembly for easily and effectively disengaging a fail-safe braking assembly on an intermediate portion of a vehicle drive train.

An additional need exists for a brake system cooling assembly that reduces the amount of brake lubricant present during non-braking operations.

SUMMARY OF THE INVENTION

In accordance with the present invention there is provided a disc braking apparatus for a motor driven vehicle that includes a drive motor. An input shaft is connected to the drive motor for rotating the input shaft at a preselected rate. An intermediate drive mechanism is drivingly connected to the input shaft to transfer rotation from the input shaft at a modified rate. A final drive mechanism is drivingly connected to the intermediate drive mechanism to transfer rotation to at least one wheel of the vehicle. A disc brake assembly is connected to the intermediate drive mechanism for applying a braking force to the intermediate drive mechanism to interrupt rotation transfer to the final drive mechanism and brake the vehicle wheel.

Further in accordance with the present invention, there is provided an underground mining machine that includes a machine frame with a traction mechanism connected to the machine frame for moving the machine frame. A drive motor is mounted on the machine frame for driving the traction mechanism. An input drive shaft is drivingly connected to the drive motor. A brake plate extends from the input drive shaft to rotate therewith. The input drive shaft is longitudinally movable and rotatably mounted on the machine frame. A planetary carrier is drivingly connected to the input drive shaft. The planetary carrier is longitudinally movable relative to the input drive shaft. A drive mechanism is drivingly connected to the planetary carrier for transmitting rotation to the traction mechanism. A brake disc assembly is mounted adjacent to the planetary carrier for movement into frictional engagement with the brake plate to apply a braking force to the brake plate and interrupt rotation of the input drive shaft to stop movement of the traction mechanism. The planetary carrier has a braking surface positioned oppositely of the brake disc assembly. The planetary carrier is longitudinally movable upon application of a preselected force thereto to move the braking surface into contact with the brake disc assembly and displace the brake disc assembly into functional engagement with the brake plate to stop rotation of the input drive shaft.

Further in accordance with the present invention there is provided a method for braking an underground mining vehicle that includes the steps of mounting a drive motor on a mining machine frame. The drive motor is drivingly connected to an input shaft. The input shaft is drivingly connected through a planetary assembly to a traction device for propelling the vehicle. A brake plate extends from the input shaft to rotate with the input shaft. Rotation is transmitted from the input shaft to a planetary carrier of the planetary assembly. The planetary carrier is provided with a braking surface. The brake plate is positioned laterally of the planetary carrier braking surface. A brake disc is positioned between the planetary carrier braking surface and the brake plate for movement into and out of frictional engagement with the brake plate. Actuating longitudinal movement of the planetary carrier relative to the input shaft moves the carrier braking surface into contact with the brake disc to move the brake disc into frictional engagement with the brake plate and interrupt rotation of the brake plate and input shaft to stop movement of the vehicle.

Accordingly, a principal object of the present invention is to provide an improved method and apparatus for braking a wheeled or tracked vehicle.

An additional object of the present invention is to provide a vehicle disc braking assembly whereby the braking force is applied at an intermediate point in a vehicle drive train, removed from the vehicle drive axle.

A further object of the present invention is to provide a failsafe vehicle braking system which is both hydraulically and manually deactivated.

A further object of the present invention is to provide a brake cooling system which cools brake discs without retarding drive transmission.

These and other objects of the present invention will be more completely disclosed and described in the following specification, the accompanying drawings, and the appended claims.

BRIEF DESCRIPTION OF THE DRAWINGS

FIG. 10 is an enlarged isometric view of the planetary carrier.

FIG. 11 is a view similar to FIG. 10, illustrating the opposite side of the planetary carrier.

FIG. 12 is an elevational view of the planetary carrier shown in FIG. 11.

FIG. 13 is a sectional view of the planetary carrier taken along line XIII—XIII in FIG. 12.

DESCRIPTION OF THE PREFERRED EMBODIMENTS

Figure 1:
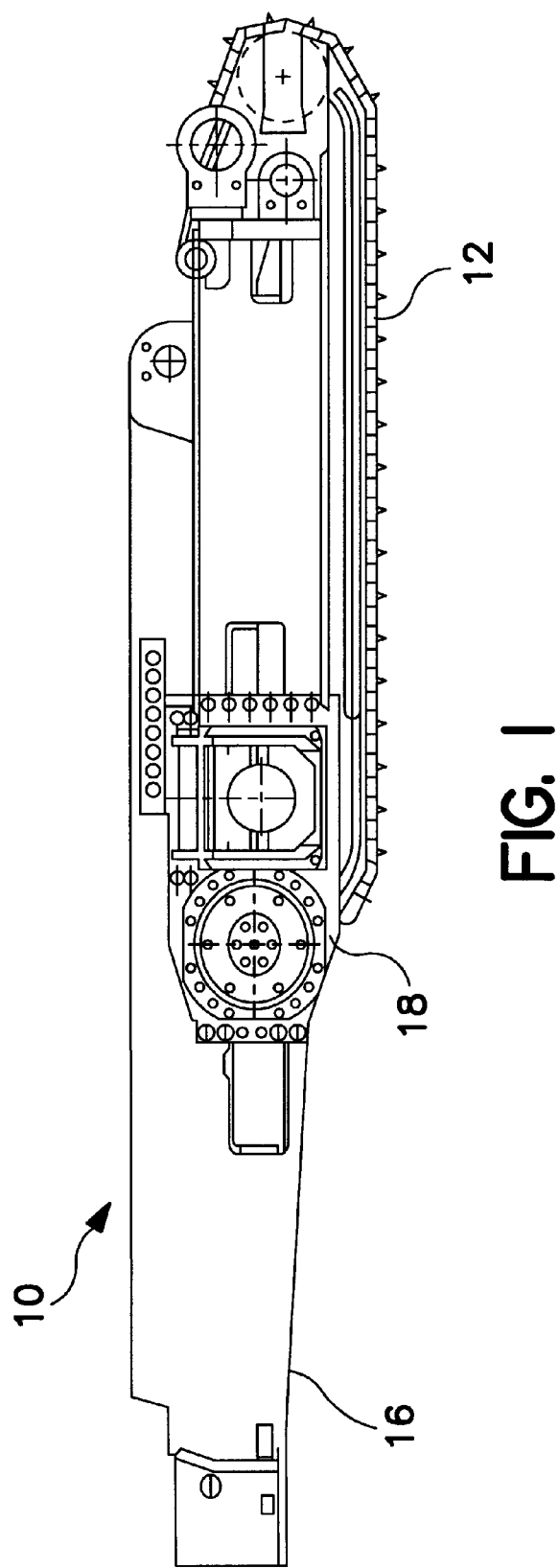
FIG. 1 is a side elevational view of tracked prime mover for an underground mining machine, illustrating a traction case and a brake assembly of the present invention.
Figure 2:
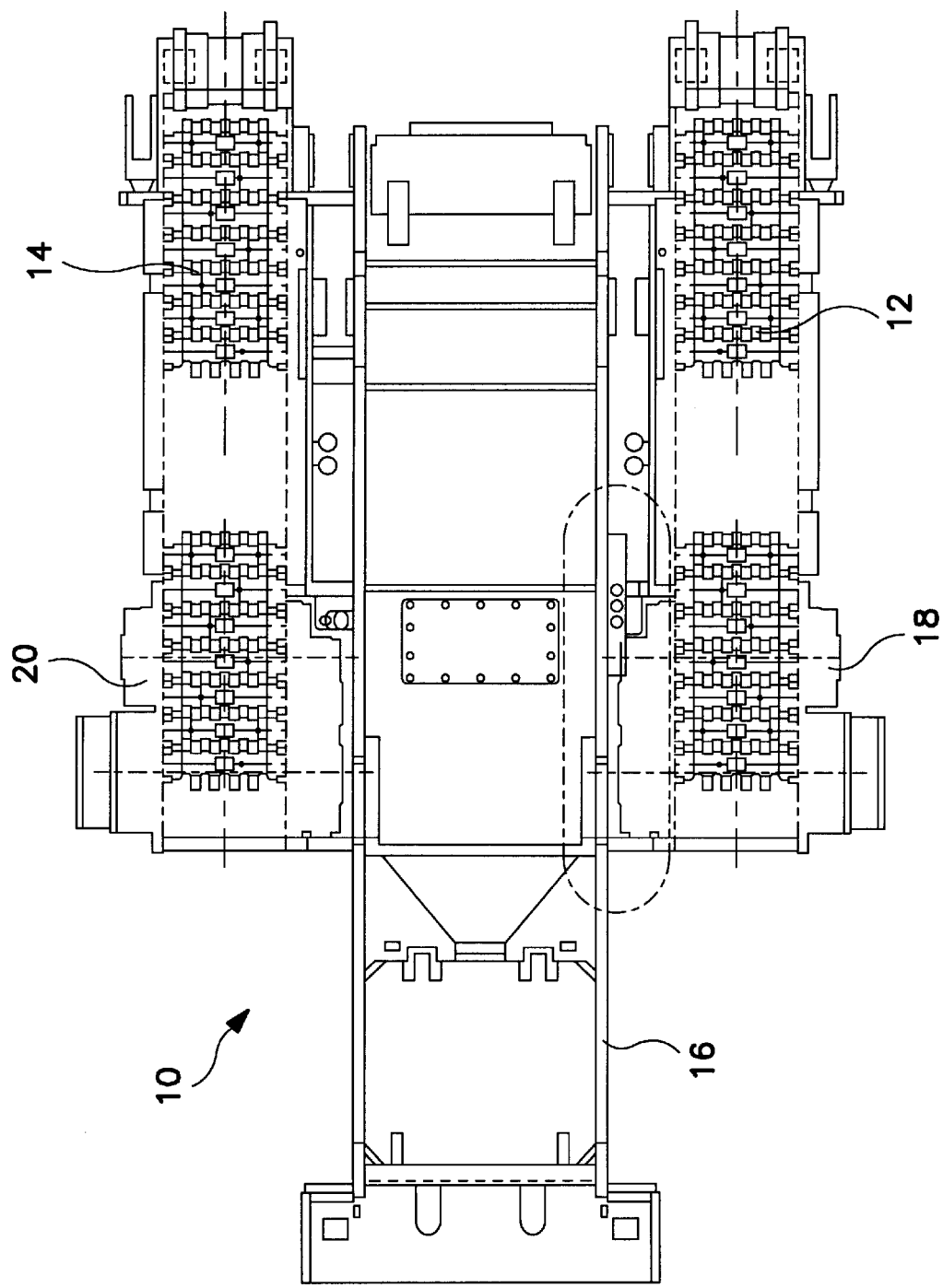
FIG. 2 is a top plan view of the prime mover shown in FIG. 1.

Referring to the drawings and particularly to FIGS. 1 and 2, there is illustrated a motorized vehicle in the embodiment of a tracked prime mover for an underground mining machine, for example a continuous mining machine, generally designated by the numeral 10. Prime mover or vehicle 10 includes a pair of endless tracks 12 and 14 mounted on a machine frame 16. The movement of tracks 12 and 14 is controlled by mechanisms housed in the respective traction cases 18 and 20 mounted on the machine frame 16. Upon actuation by an operator, the traction cases 18 and 20 are operated in one mode in unison to effect forward or reverse movement of the prime mover 10 and in a second mode to brake the prime mover or effect turning of the prime mover 10. In another embodiment (not shown) of an underground traction device, the machine frame 16 is propelled by driven wheels mounted on the frame 16.

Figure 3:
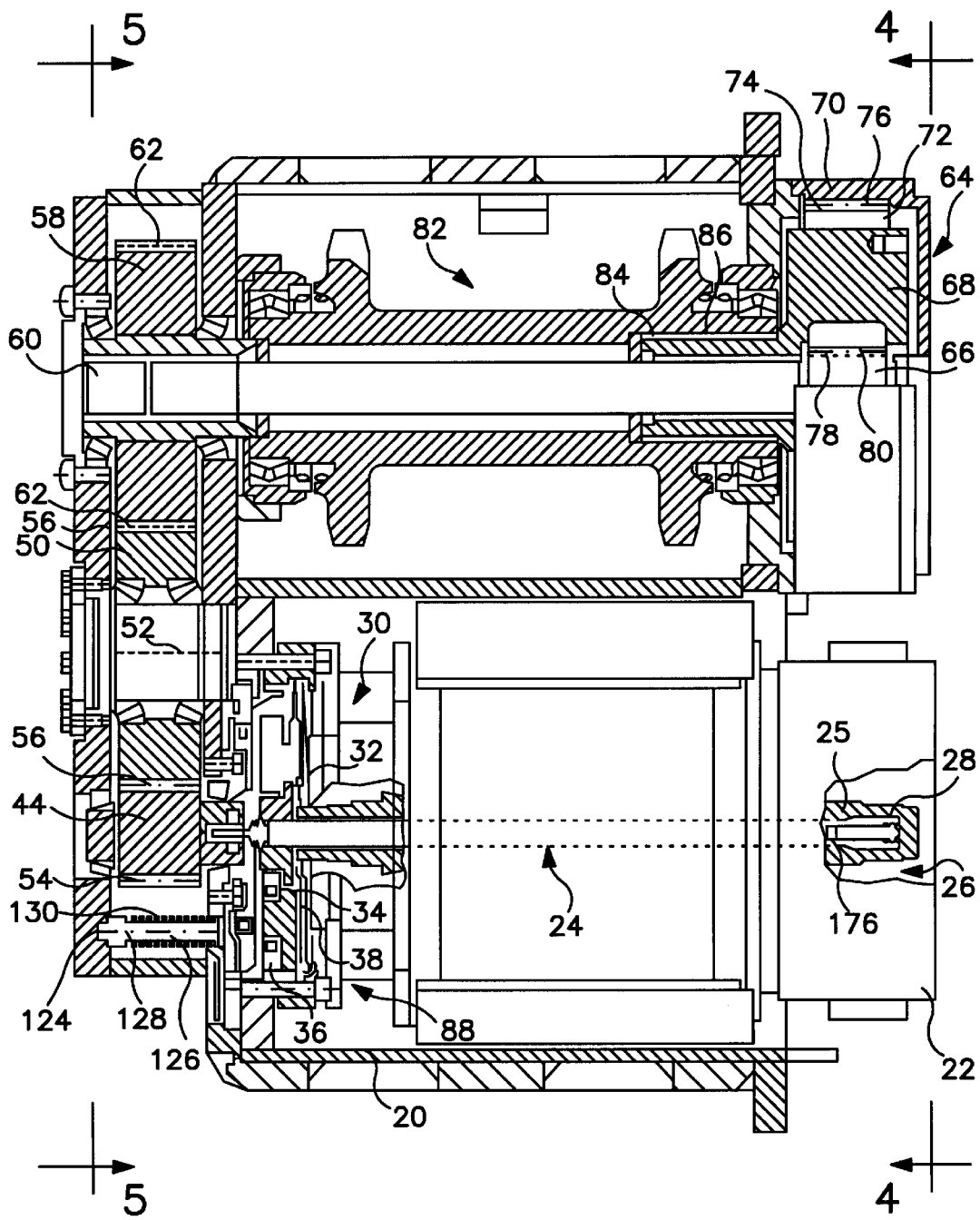
FIG. 3 is a top plan, horizontal sectional view of the traction case mounted on the left side of the prime mover shown in FIG. 2, illustrating a vehicle drive train and the brake assembly of the present invention.
Figure 4:
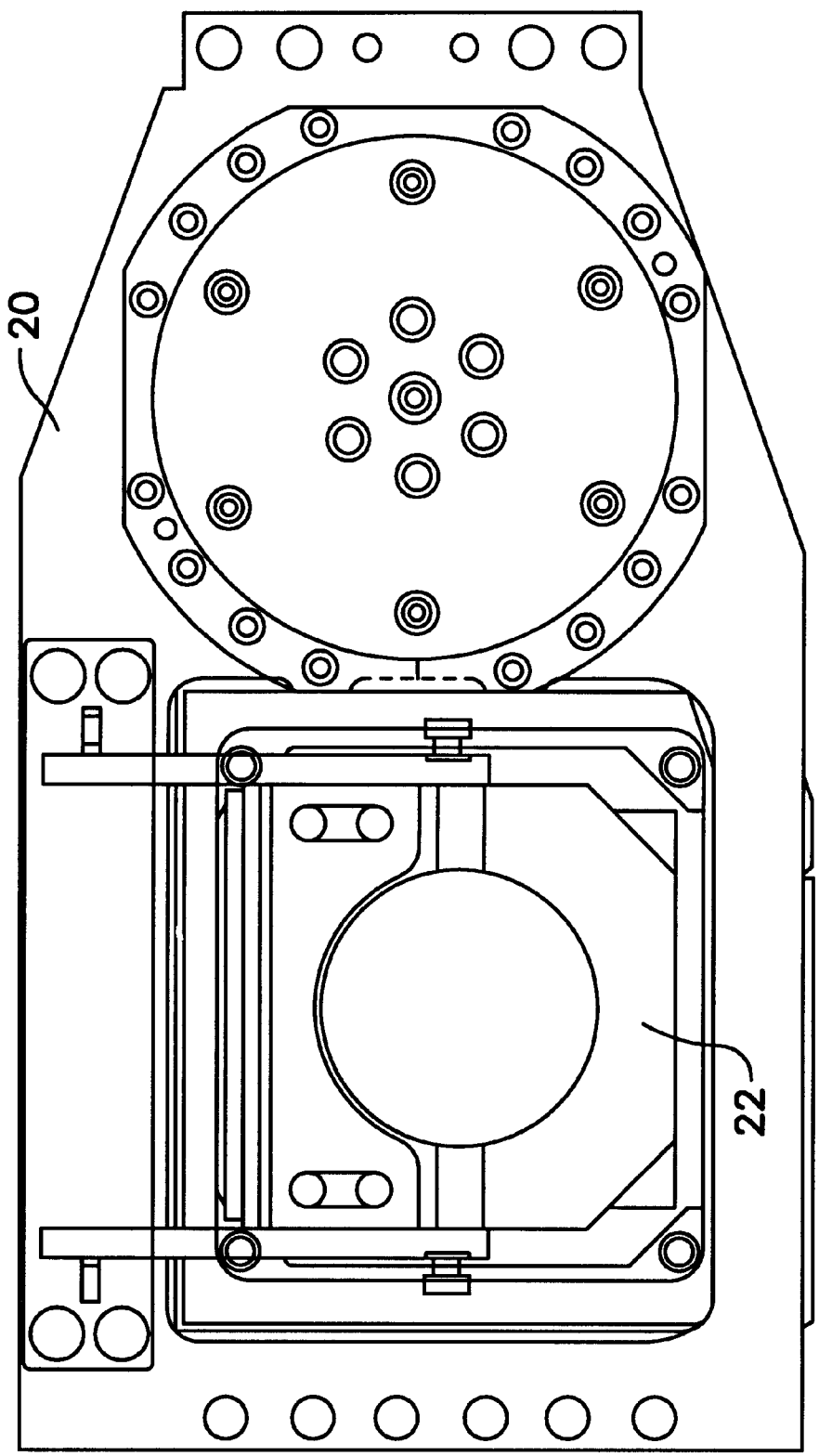
FIG. 4 is an end view of the traction case taken along line IV—IV in FIG. 3.

Now referring to FIG. 3, there is illustrated the traction case 20 which controls the rotation of the left side tracks 14 of prime mover 10 shown in FIG. 2. Rotation of tracks 14 is generated by a drive motor generally designated by the numeral 22. Drive motor 22 is conventional in design and is beyond the scope of the present invention.

Drive motor 22 is drivingly connected to an input shaft generally designated by the numeral 24. Input shaft 24 is rotatably supported within an input shaft housing 25 and includes an input end generally designated by the numeral 26. Input end 26 includes splines 28 that mesh with corresponding teeth of the drive motor (not shown). Splines 28 permit the input shaft 24 to move longitudinally relative to the drive motor 22 while still being driven by the drive motor 22.

Figure 6:
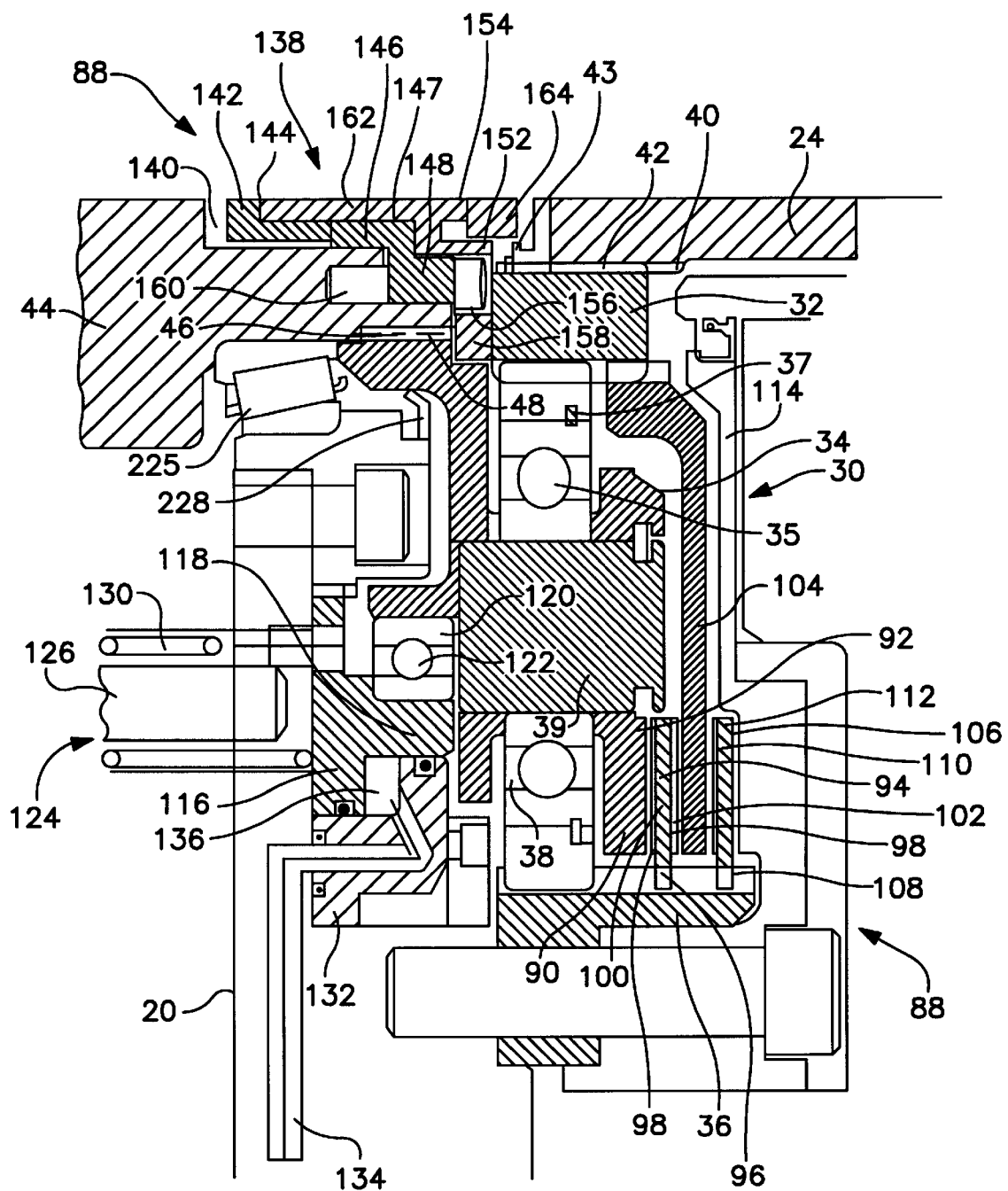
FIG. 6 is an enlarged fragmentary sectional view of the brake assembly shown in FIG. 3.

Drive is transferred by input shaft 24 to an intermediate drive mechanism generally designated by the numeral 30 in FIG. 3 that includes in one embodiment a first stage planetary assembly. The first stage planetary assembly 30 includes sun gear 32, planetary carrier 34 and ring gear 36. The planetary carrier 34 supports a plurality of planetary gears 38, one of which is shown in FIGS. 3 and 6. Each planetary gear 38 is mounted on a bearing 35 by a snap ring 37. The bearing 35 is in turn supported on the planetary carrier 34 by a planetary pin 39. External splines 40 on input shaft 24 mesh with gear teeth 42 of the sun gear 32. With the above described geared arrangement, rotation is transmitted from the input shaft 24 through the sun gear 32 to the planetary gears 38.

In a manner similar to the input shaft 24, the first stage planetary assembly 30 is longitudinally movable relative to the traction case 20. Although both the input shaft 24 and the sun gear 32 are longitudinally movable, the relative longitudinal positions of the sun gear 32 and the input shaft 24 are fixed by a snap ring 43 set in sun gear 32. Rotation of the sun gear 32 drives the planetary gears 38 and the planetary carrier 34. The relationship between the planetary gears 38 and the planetary carrier 34 is such that the rate of rotation of the planetary carrier 34 is modified from the rate of rotation of the input shaft 24 and the sun gear 32 by a preselected ratio. In a preferred embodiment, the planetary carrier 34 rotates at one fifth the rate of rotation of the input shaft 24 and sun gear 32.

Following rate modification by the first planetary assembly 30, rotation is transferred to a pinion 44 for delivery to the final stages of the vehicle drive train. As shown in FIGS. 3 and 6, pinion 44 is rotatably mounted in traction case 20. Unlike the input shaft 24 and the first planetary assembly 30, pinion 44 and all subsequent drive train components are longitudinally fixed relative to the traction case 20. Pinion 44 is driven by the planetary carrier 34 through intermeshing gear teeth 46 and 48. Gear teeth 46 and 48 permit the planetary carrier 34 to move longitudinally along its rotational axis relative to the pinion 44 without interruption of the driving connection therebetween.

As shown in FIG. 3 rotation is transferred from pinion 44 to a reach gear 50 rotatably mounted on an idler shaft 52 which is rotatably positioned in traction case 20. Reach gear 50 and pinion 44 are meshingly engaged through corresponding gear teeth 54 and 56. Following transfer through the reach gear 50, rotation is delivered to a drive gear 58 nonrotatably mounted on a drive shaft 60. The drive shaft 60 is rotatably supported in the traction case 20 and extends parallel to the input shaft 24. The drive gear 58 includes gear teeth 62 which mesh with gear teeth 56 on reach gear 50.

From the drive gear 58 rotation is transmitted from the intermediate drive mechanism 30 through drive shaft 60 to a final drive mechanism generally designated by the numeral 64 in FIG. 3 that includes in one embodiment a second stage planetary assembly. Second stage planetary assembly 64 includes a sun gear 66, a planetary carrier 68, and a ring gear 70. The planetary carrier 68 includes a plurality of planetary gears 72, one of which is shown in FIG. 3. Each planetary gear 72 includes a plurality of teeth 74 on its outer edge for engaging corresponding teeth 76 of the ring gear 70. Further, each planetary gear 72 is engaged through meshing teeth 78 with corresponding teeth 80 on the sun gear 66. The effect of the second stage planetary assembly 64 is to modify the rotational speed of the drive train by a preselected amount.

Planetary carrier 68 transmits rotation to a sprocket assembly generally designated by the numeral 82 in FIG. 3 through teeth 84 engaged with corresponding teeth 86 on sprocket assembly 82. Sprocket assembly 82 engages tracks 14 shown in FIG. 2 to move the prime mover 10 in either a forward or a reverse direction. It should be understood that the above described arrangement for transmitting drive from the traction case 20 to the tracks 14 on the left side of machine frame 16 is replicated on the right side of the machine frame 16 in transmitting drive from the traction case 18 to the tracks 12 to propel the prime mover 10.

BRAKE ASSEMBLY

Referring to FIG. 6, there is schematically illustrated a brake assembly generally designated by the numeral 88. The brake assembly 88 in accordance with the present invention is connected to the intermediate drive mechanism 30 that transfers rotation from the input drive shaft 24 through the final drive mechanism 64 to the tracks 14. The intermediate drive mechanism 30, including the input shaft 24, is connected through the planetary carrier 34 to the brake assembly 88 and thus the carrier 34 is a component of the brake assembly 88.

The planetary carrier 34, as illustrated in detail in FIGS. 10–13, includes an annular flange portion 90 having a braking surface 92 thereon that functions as a brake force applicator. As illustrated in FIG. 6, positioned oppositely of the braking surface 92 is an annular brake disc 94 meshingly engaged to the ring gear 36 by teeth 96 to permit longitudinal movement of the brake disc 94 relative to the ring gear 36. Brake disc 94 includes high friction braking surfaces 98 on both its inside surface 100 and its outside surface 102.

An annular brake plate 104 is connected through the sun gear 32 to the input shaft 24 to rotate with the input shaft 24. The brake plate 104 extends from the input shaft 24 to a position adjacent to the brake disc 94 and laterally spaced from the carrier braking surface 92. The brake disc 94 is movable into and out of frictional engagement with brake plate 104 upon lateral movement of the planetary carrier 34 when the brake assembly 88 is actuated and de-actuated. Brake plate 104 is drivingly connected through the sun gear 32 to the input shaft 24 to rotate with the input shaft 24. The brake plate 104 is also longitudinally movable on sun gear 32 upon actuation of brake assembly 88.

Positioned adjacent to brake plate 104 is a second annular brake disc 106 also meshingly engaged to the ring gear 36 by teeth 108. Brake disc 106, like brake disc 94, includes a high friction braking surface 110 on its inside surface 112 to frictionally engage brake plate 104 upon actuation of the brake assembly 88. Movement of brake disc 106 longitudinally relative to the ring gear 36 is restrained by brake cover 114 abutting brake disc 106. The majority of the braking of shaft 24 is provided at brake plate 104; however, at lower speeds braking occurs at the interface of carrier 34 and brake disc 94.

Planetary carrier 34 and integral flange portion 90, brake disc 94, and brake plate 104 are longitudinally movable relative to ring gear 36 in the traction case 20 to apply a frictional braking force to plate 104 to interrupt rotation of plate 104 and input shaft 24 and brake movement of tracks 14 of vehicle 10. The brake assembly 88 is spring actuated to apply a force longitudinally upon the planetary carrier 34 to move the braking surface 92 of the carrier 34 into frictional engagement with the braking surface 98 on the inside surface 100 of the brake disc 94. Consequently, the braking surface 98 on the outside surface 102 of brake disc 94 moves into frictional engagement with the inside surface of brake plate 104.

In the brake applied mode of operation, the brake plate 104 is displaced longitudinally into frictional engagement with the braking surface 110 on the inside surface 112 of brake disc 106. This stops rotation of brake plate 104 and input shaft 24 to interrupt rotation of input shaft 24, drive shaft 60, and sprocket assembly 82 shown in FIG. 3 to stop movement of vehicle tracks 14. In the same manner transmission of rotation from traction case 18 on the right side of the machine frame 16, shown in FIG. 2, is interrupted to the tracks 12 to stop movement of vehicle 10.

The brake assembly 88 of the present invention provides a fail-safe braking action through the planetary carrier 34 in the event of a loss of hydraulic pressure on the machine. The brake assembly 88 remains disengaged or in a brake released mode of operation as long as a preselected hydraulic pressure restrains longitudinal movement of planetary carrier flange portion 90 out of frictional engagement with brake disc 94. A fail-safe brake system is spring actuated upon loss of the required hydraulic pressure to restrain a spring force from urging the planetary carrier 34 into contact with brake disc 94. Thus fail-safe braking of the vehicle 10 is achieved by spring actuation of the brake assembly 88.

Actuation of the fail-safe brake system is prevented by supplying hydraulic fluid under pressure, restraining longitudinal movement of planetary carrier 34 to engage disc 94. Once actuated, the brake assembly 88 is released only upon the application of a preselected hydraulic pressure to overcome the spring bias and restore drive transmission to the input shaft 24 and move the vehicle.

As seen in FIG. 6, a normally spring biased annular pressure plate or piston 116 is nonrotatably positioned in traction case 20 and forms an axially movable portion of the housing surrounding planetary carrier 34. The plate 116 is longitudinally movable in the traction case 20 and includes an annular flange 118. A thrust bearing 122 is positioned between plate flange 118 and planetary carrier 34 and thereby allows the carrier 34 to self-center in the first stage planetary assembly 30. For clarity of illustration thrust bearing 122 is not illustrated in FIG. 7.

To actuate the brake assembly 88, a series of spring loaded guide pins 124 are stationarily positioned in traction case 20. As shown in FIGS. 3 and 6, each guide pin 124 includes a shaft portion 126 and a head portion 128. The shaft portion 126 is surrounded by a spring 130 having a preselected length and tension. Spring 130 is seated at one end against the head portion 128. At the opposite end the spring 130 exerts a force upon the pressure plate 116 to laterally displace the bearings 122 and planetary carrier 34 to actuate the brake assembly 88 and stop the vehicle.

To counteract the normal operation of springs 130 to actuate the brake assembly 88, it is necessary to introduce hydraulic fluid under pressure to exert an opposite force against the pressure plate 116 to move planetary carrier flange portion 90 out of frictional contact with brake disc 94 and release engagement of the disc brakes 94 and 106 with the brake plate 104. An annular fluid plate 132 shown in FIG. 6 overlies the pressure plate 116. The fluid plate 132 includes hydraulic line 134 connected to a sealed annular cavity 136 formed between pressure plate 116 and fluid plate 132. Hydraulic fluid is supplied through line 134 to cavity 136. The fluid in cavity 136 exerts a force against pressure plate 116 to compress the springs 130 so that planetary carrier 34 is separated from contact with brake disc 94. In this manner brake assembly 88 is disengaged.

Further it should be understood that the above described brake assembly 88 for braking tracks 14 on the left side of prime mover 10 is provided for braking tracks 12 on the right side of prime mover 10. The brake assemblies for the tracks 12 and 14 are operable in unison or independently to control movement of the vehicle 10.

MANUAL DISENGAGEMENT ASSEMBLY

In certain circumstances, upon the fail-safe engagement of the brake assembly 88, hydraulic pressure can not be restored to the system to release the braking action. The brake assembly 88 remains engaged for both tracks 12 and 14; consequently, the vehicle can not be moved. In order to disengage the brake assembly 88 and permit movement of the vehicle, the brake assembly 88 must be manually disengaged. Manual disengagement is accomplished by a manual disengagement assembly generally designated by the numeral 138 in FIG. 6.

Figure 7:
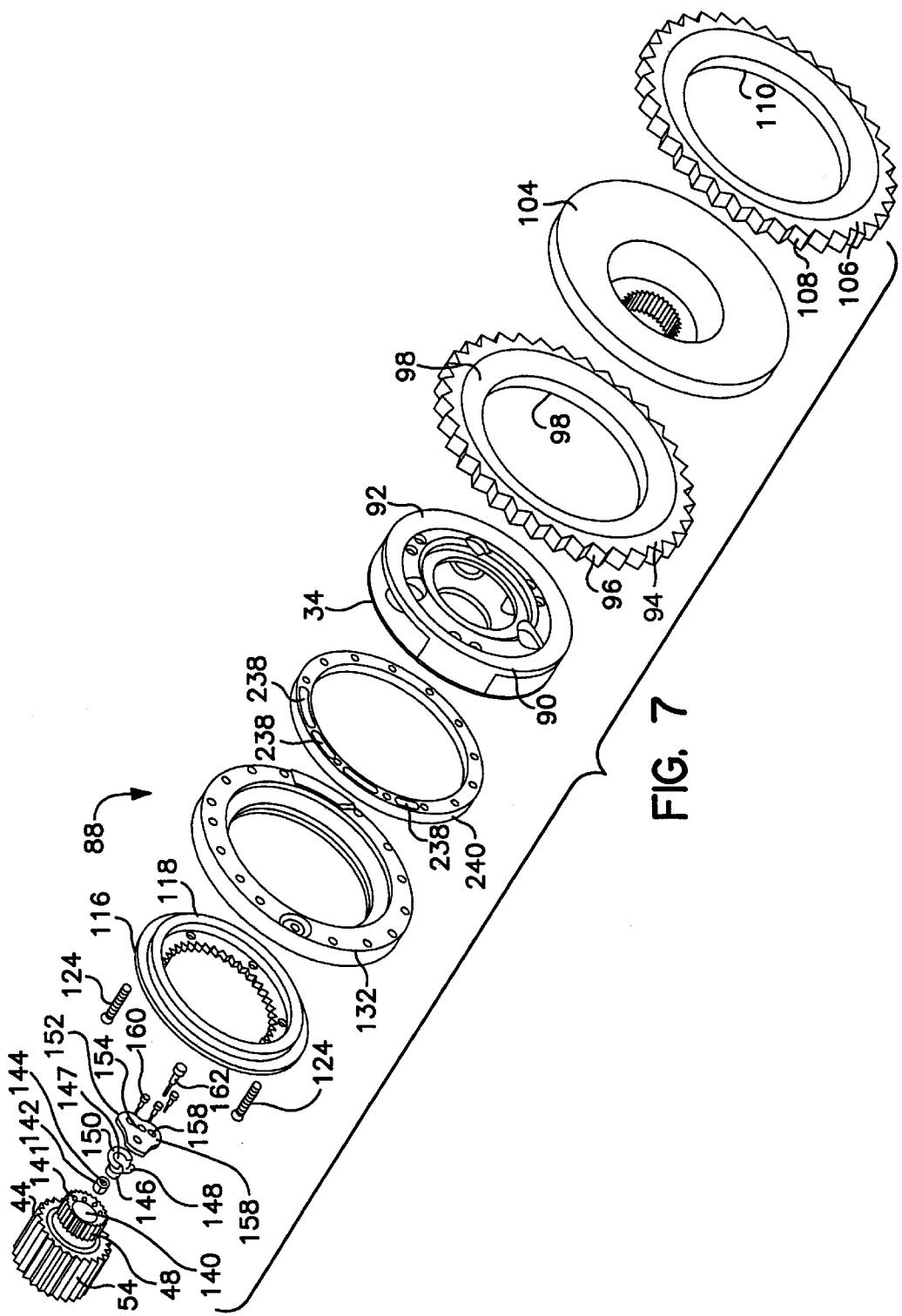
FIG. 7 is an exploded isometric view of the brake assembly of the present invention.

Manual disengagement assembly 138 is operable to manually retract the planetary carrier 34 to compress the springs 130. As shown in FIGS. 6 and 7, the axially fixed pinion 44 includes an axial cavity 140 and a plurality of radially spaced threaded bores 141 (FIG. 7). A cap nut 142 is locked in position in cavity 140 and includes a threaded bore 144. Next, a bushing 146 is positioned in cavity 140 and includes a threaded bore 147. The bushing 146 is positioned adjacent to the cap nut 142. Bushing 146 also includes an outer flange portion 148 having a plurality of grooves 150 (FIG. 7) therein.

Further as shown in FIG. 7, the bushing 146 is positioned adjacent to a thrust washer 152 having a central bore 154 therethrough and a plurality of bores 156 aligned with the grooves 150 in bushing 146. Thrust washer 152 includes an outer flange portion 158 extending beyond the outer periphery of pinion spline 48 and into overlying relation with sun gear 32. This overlying relation causes the thrust washer 152, sun gear 32 and the planetary carrier 34 to move axially to the right as shown in FIG. 6 under the force of springs 130 to actuate the brake assembly 88. The pinion 44 remains fixed as the carrier 34 slides on the splined end of pinion 44. Likewise, due to the overlying relation, forced retraction of the thrust washer 152 also forces the retraction of the planetary carrier 34 and the springs 130 to disengage the braking system 88.

As shown in FIGS. 6 and 7, thrust washer 152 and bushing 146 are prevented from rotating relative to pinion 44 by socket head bolts 160 extending through thrust washer bores 156. The bolts 160 also retain bushing 146 in pinion 44. It should be noted that although bolts 160 prevent the relative rotation of thrust washer 152 they do not prevent the axial disposition of thrust washer 152.

A release bolt 162 extends through thrust washer bore 154 and into threaded engagement with bore 147 in bushing 146 and the threaded bore 144 of cap nut 142. Engagement of cap nut 142 to the release bolt 162 limits the travel of release bolt 162. Release bolt 162, as shown in detail in FIGS. 14–17, includes at one end a socket head 164 having a larger diameter than that of central bore 154 in thrust washer 152. With this arrangement, rotation of hexagonal socket head 164 advances release bolt 162 into bushing 146. This forces the planetary carrier 34 into the brake release position and consequently disengagement of the braking system 88. With this arrangement the release bolt 162 is used as a mechanical override release for brake assembly 88. The bolt 162 is shown in FIG. 6 in the normal release position of the assembly 88.

As shown in FIG. 14–17, the release bolt 162 includes a central bore 165 the full length thereof. Return oil passes through the central bore 165 to lubricate contact of thrust washer 152 with the sun gear 32.

Manual disengagement assembly 138, including the socket head 164 of release bolt 162, is positioned at an interior portion of the traction case 20 and axially aligned with the input shaft 24. Therefore, in order to reach the socket head 164 of release bolt 162 with an appropriate tightening tool, the input shaft 24 must be either removed or otherwise utilized in some fashion.

Figure 8:
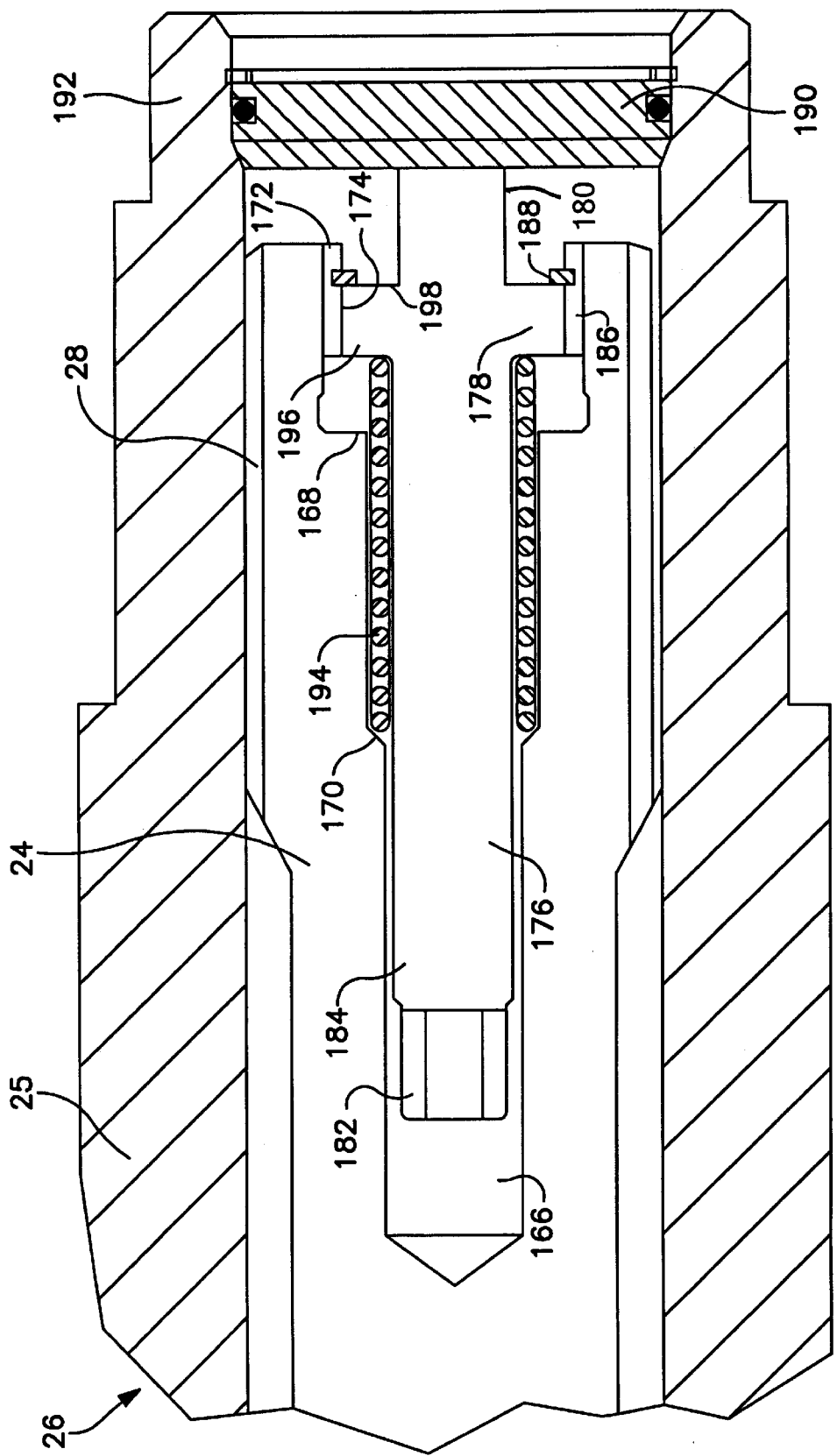
FIG. 8 is an enlarged fragmentary top plan, schematic sectional view of one end of the input shaft connected to the brake assembly, illustrating one embodiment of a manual brake release device.

Now referring to FIG. 8, there is illustrated one embodiment of the present invention in which the input end 26 of input shaft 24 includes an axial stepped cavity 166. Cavity 166 is formed with a first shoulder portion 168 longitudinally spaced from a second shoulder portion 170. Cavity 166 also includes an outer annular portion 172 with internal splines 174.

As shown in FIG. 8, a plunger 176 is positioned in cavity 166. Plunger 176 is generally cylindrical and includes an annular flange 178 at end portion 180 and a hexagonal head 182 extending from an opposite end portion 184. Annular flange 178 includes external splines 186 that mesh with the internal splines 174 so that plunger 176 rotates with input shaft 24, while still permitting limited longitudinal travel of plunger 176. The longitudinal travel between the input shaft 24 and the plunger 176 is limited by a snap ring 188 positioned on outer portion 172 of input shaft cavity 166. Longitudinal travel of plunger 176 out of input shaft 24 is prevented by a shaft plug 190 retained in outermost end 192 of input shaft housing.

Plunger 176 is surrounded in part by a coil spring 194 having a preselected tension. The spring 194 is seated at one end against internal shaft shoulder 170 and at the opposite end against shoulder 196 of annular flange 178. Upon actuation of brake assembly 88, the engagement of snap ring 43, as shown in FIG. 6, with sun gear 32 and input shaft 24 effects longitudinal travel of input shaft 24 and compresses spring 194 shown in FIG. 8. The force of spring 194, upon deactivation of the brake assembly 88, urges the input shaft 24 to return to its operational or release position as shown in FIG. 6.

To manually disengage the embodiment shown in FIG. 8, the shaft plug 190 and the input shaft 24 are removed from the machine. Next, snap ring 188 is removed and the plunger 176 is removed from cavity 166. The plunger 176 is next inverted so that outer portion 198 of annular flange 178 abuts against shoulder portion 168 of cavity 166 and the meshing engagement of splines 186 and 174 prevents relative rotation therebetween. The snap ring 188 is replaced and the entire input shaft 24 is inverted and positioned in the input shaft housing 25 in axial alignment with the release bolt 162.

Hexagonal head 182 of plunger 176 is now positioned in driving relation with socket head 164 of release bolt 162. Typically the sun gear end of input shaft 24 is provided with a slot (not shown) to aid in the turning of input shaft 24.

By using a screwdriver or the like, the input shaft 24 is turned, thereby advancing the release bolt 162 into threaded bore 147 of bushing 146. This retracts the thrust washer 152 and pushes the planetary carrier 34 to the left, as shown in FIG. 6, to disengage the brake assembly 88. After the brake is released, the input shaft 24 is reassembled in the housing 25 as shown in FIG. 8.

Figure 9:
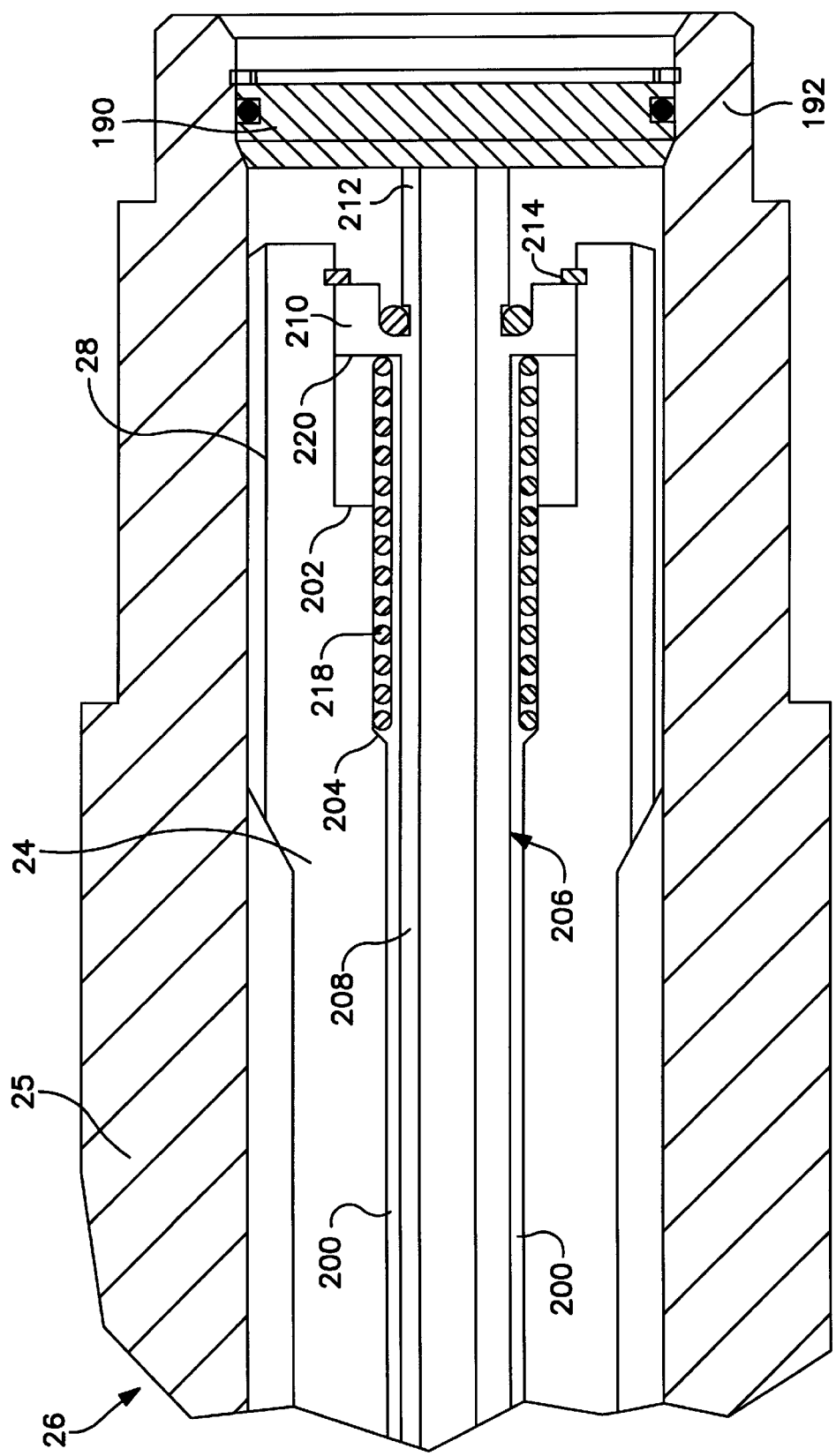
FIG. 9 is a view similar to FIG. 8, illustrating a second embodiment of a manual brake release device.
Figure 14:
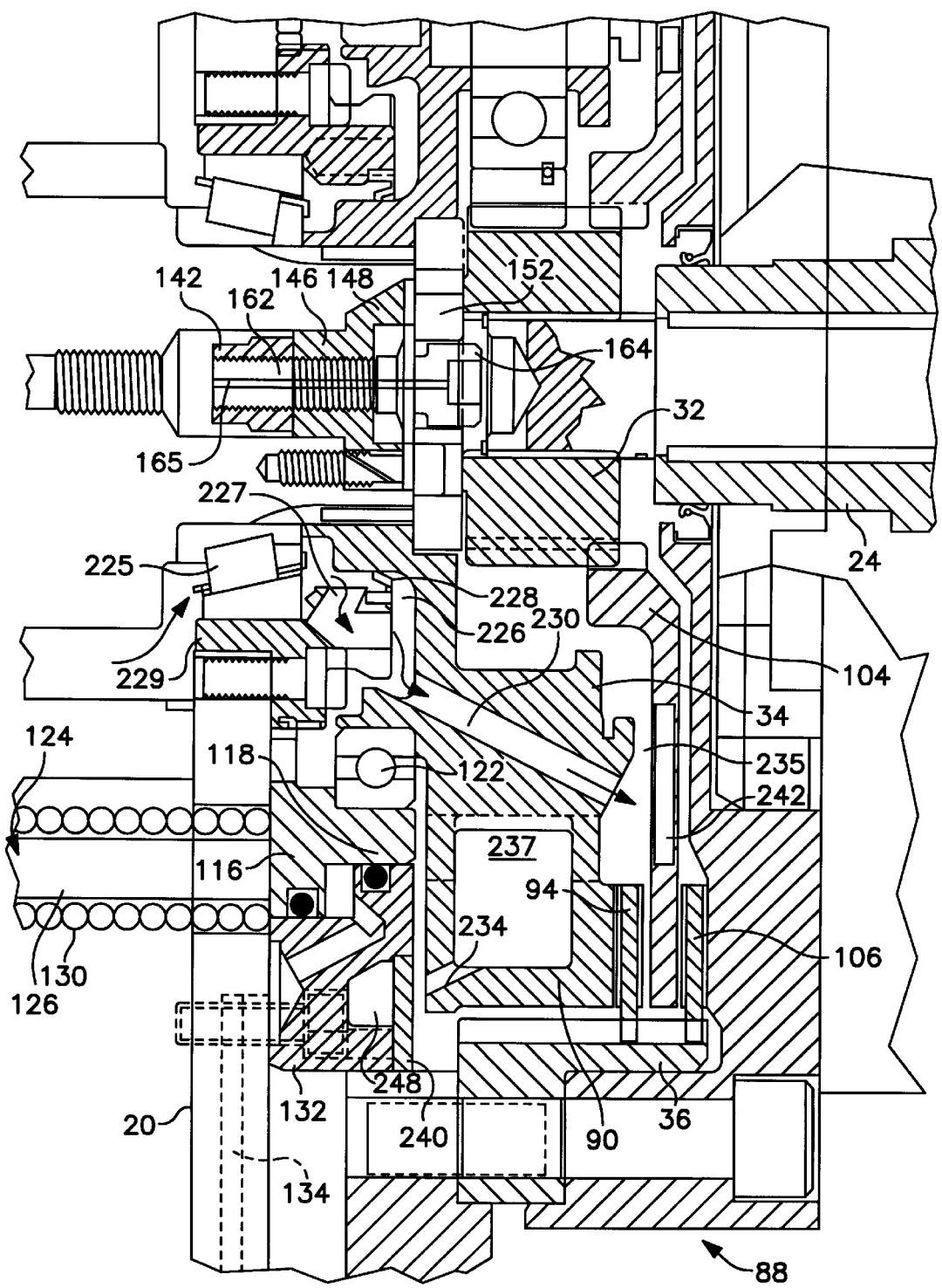
FIGS. 14–17 are enlarged fragmentary sectional views of the brake assembly similar to FIG. 6, each illustrating a selected section of the planetary carrier.

Now referring to FIG. 9, there is illustrated another embodiment of the present invention in which like elements are designated by like numerals shown in FIG. 8. Unlike the embodiment shown in FIG. 8, a central bore 200 is rifle drilled completely through the center of input shaft 24. Central bore 200 also includes a plurality of annular steps forming a first shoulder portion 202 and a second shoulder portion 204. A plunger generally designated by the numeral 206 is positioned to extend completely through central bore 200. Plunger 206 is formed from a hexagonal bar 208 which conforms to the socket head 164 of release bolt 162.

Plunger 206 also includes an external annular flange 210 at end portion 212. Travel of the plunger 206 out of input shaft 24 is restrained by a snap ring 214 retained on the input shaft 24 at the outer end of the input shaft central bore 200. In a manner similar to that shown in FIG. 8, longitudinal travel of the input shaft 24 out of the input shaft housing 25 is prevented by the sealed shaft plug 190 positioned in the outermost end 192 of input shaft housing 25.

Further as shown in FIG. 9, plunger 206 is surrounded in part by a spring 218 having a preselected tension. The spring 218 is seated at one end against internal shaft shoulder portion 204 and at the opposite end against shoulder 220 of annular flange 210. Upon actuation of brake assembly 88, the engagement of snap ring 43, shown in FIG. 6, with sun gear 32 and input shaft 24 effects longitudinal travel of input shaft 24 against the force of spring 218. The force of spring 218, upon deactivation of the brake assembly 88, urges the input shaft 24 to return to its normal operational position in housing 25.

To manually disengage the embodiment shown in FIG. 9, the shaft plug 190 is removed and a socket head wrench is positioned in the outermost end 212 of plunger 206. The wrench is depressed to urge the plunger 206 against the force of spring 218 and into engagement with the socket head 164 of release bolt 162 shown in FIGS. 6 and 10. The wrench is then turned, thereby driving the release bolt 162 into threaded bore 147 of bushing 146 and forcing the retraction of thrust washer 152 to disengage the brake assembly 88, as above described.

FLUID PUMPING OPERATION

During operation of the brake assembly 88, it is often necessary to provide lubrication between the various braking components to cool the brake assembly 88. Further, it is known that lubrication of the brake assembly 88 can effect a retarding force on the drive train elements through the exertion of shear forces on the rotating elements. At low speeds the retarding force generated by the fluid shear forces in the released position of the brake assembly 88 is not significant. At high speeds the retarding force becomes an adverse factor.

Figure 5:
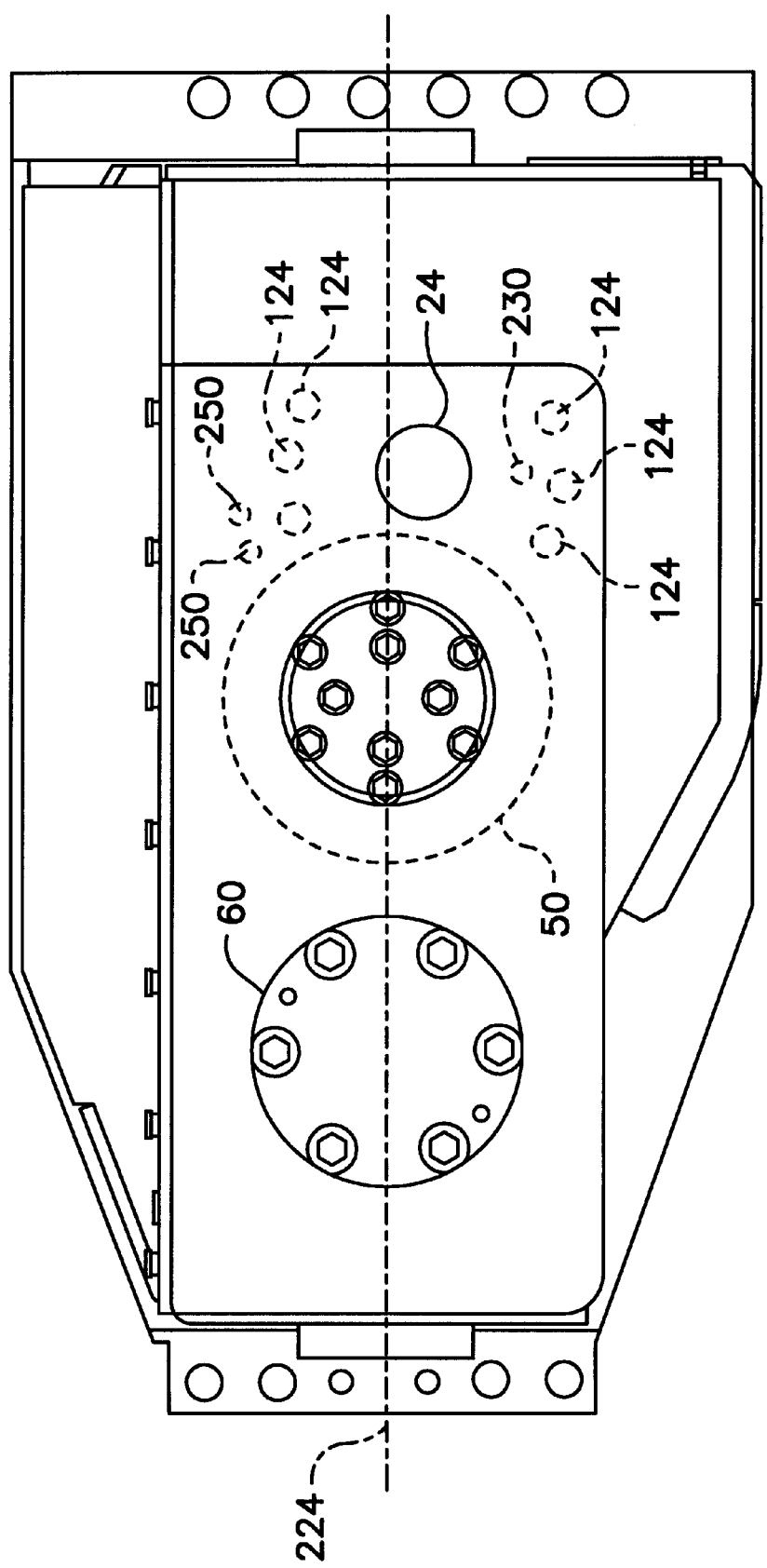
FIG. 5 is an end view of the traction case taken along line V—V in FIG. 3.

In accordance with the present invention, as illustrated in FIGS. 14–17, the planetary carrier 34 includes fluid passageways that pump fluid in one operation into the brake assembly 88 for cooling the brake discs 94 and 96 and brake plate 104. In a second operation, carrier 34 pumps excess fluid out of the assembly 88 to control the fluid level therein. The nominal fluid level in the brake assembly 88 is just above the center line of the input shaft 24. This oil level is indicated by dashed line 224 shown in FIG. 5.

In a brake released mode of operation, it is desirable to reduce the quantity of oil surrounding the planetary carrier 34, brake discs 94 and 106 and brake plate 104 to reduce the shear force losses and increase drive motor performance. Preferably, the fluid level is controlled so that any losses in drive performance due to viscous shear forces are limited to motor speeds in the range of 3000 r.p.m. When the drive motor speeds are in excess of 3000 r.p.m. and approach the range of 4000 to 5000 r.p.m., the retarding action of the viscous shear forces adversely affects performance of the drive motor. To prevent this retarding action from occurring, excess fluid is pumped out of the brake assembly 88 in accordance with the present invention.

In an alternative operation, the presence of excess fluid in assembly 88 is used to prevent overspeed of the drive motor. Thus a retarding action on the drive motor is desirable at 4000 r.p.m. to prevent operation above 5000 r.p.m. This method serves to provide a speed limit on the motor.

Referring to FIGS. 14–17, where like elements are designated by like numerals in FIGS. 3, 6, and 7, lubricating oil is conveyed into the traction case 20 through bearing 225 and port 227 of bearing carrier 229. From port 227 the fluid passes into an annular ring cavity 226 sealed by lip seal 228. Oil is directed through port 230 (FIG. 14) of planet carrier 34 into carrier cavity 235. From cavity 235 the fluid circulates around and through brake plate 104 to cool the plate 104.

As shown in FIGS. 14–17 lip seal 228 normally bears against a seal surface on planetary carrier 34 to seal ring cavity 226 around carrier 34. However, upon axial movement of carrier 34 away from the lip seal 228, the carrier 34 disengages from sealed contact with lip seal 228 to allow additional oil flow into cavity 226 and through the planetary carrier 34. In this respect the planetary carrier 34 functions as a valve for controlling the flow of oil to the brake components, above identified, in the carrier cavity 235.

As discussed above, in one method of operation the nominal oil level in the brake assembly 88 to provide cooling of the brake components without adversely affecting drive motor performance is above the center line of the input drive shaft 24. This is attained by the pumping action generated by rotation of the planetary carrier 34. Not only does rotation of carrier 34 facilitate flow of oil into the brake assembly 34, it also conveys excess oil out of the assembly 88.

Oil circulates from cavity 235 into carrier cavity 236. The cavity 236 is formed of a plurality of bucket-like recesses 237, as shown in FIGS. 10–13, spaced circumferentially on the periphery of carrier 34. With this arrangement the oil in cavity 236 is circulated around the input shaft 24 as the carrier 34 rotates. Oil in cavity 236 is captured by the bucket recesses 237 and carried around the input shaft 24 as the carrier 34 rotates.

Figure 15:
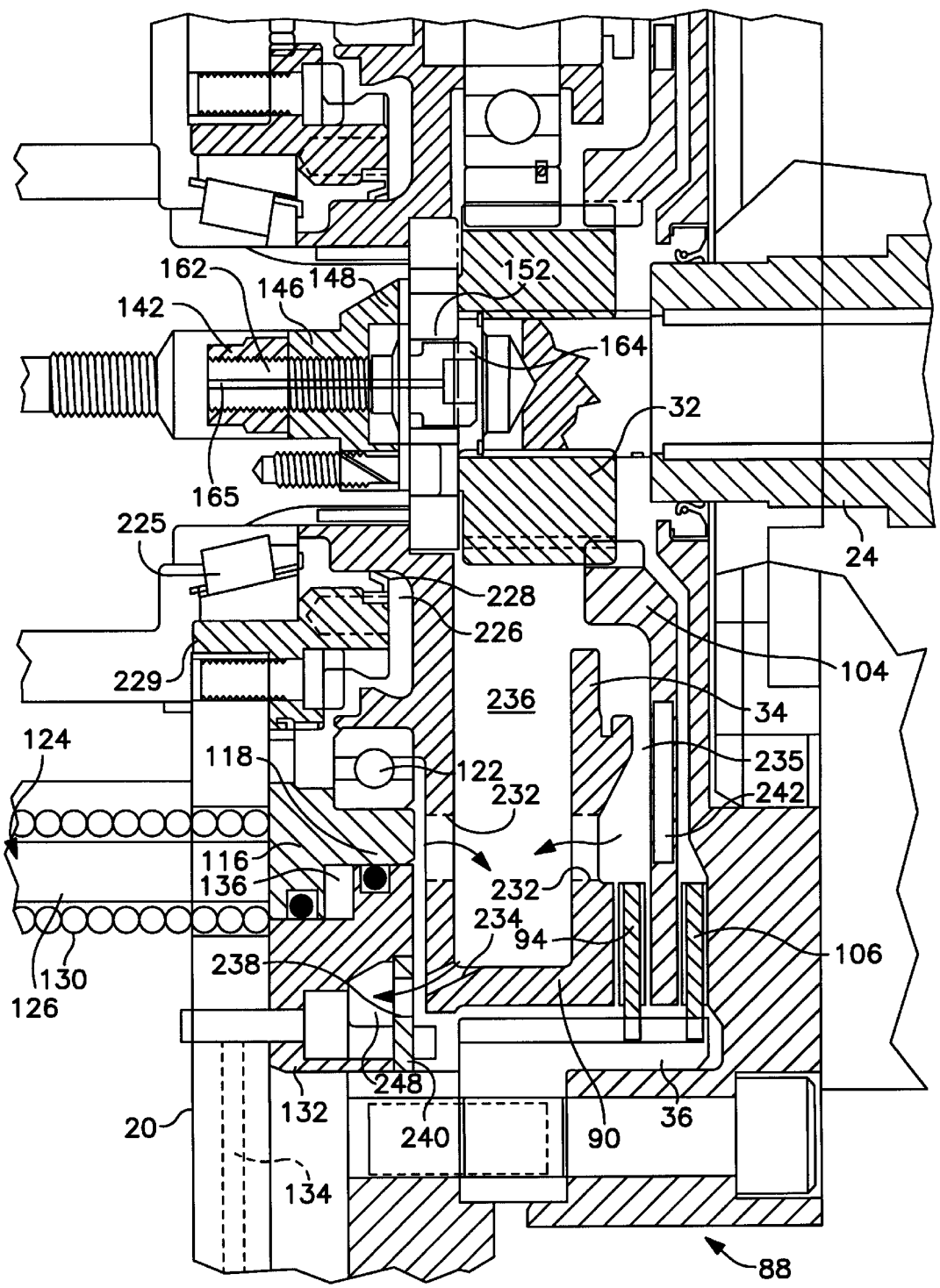
Figure 16:
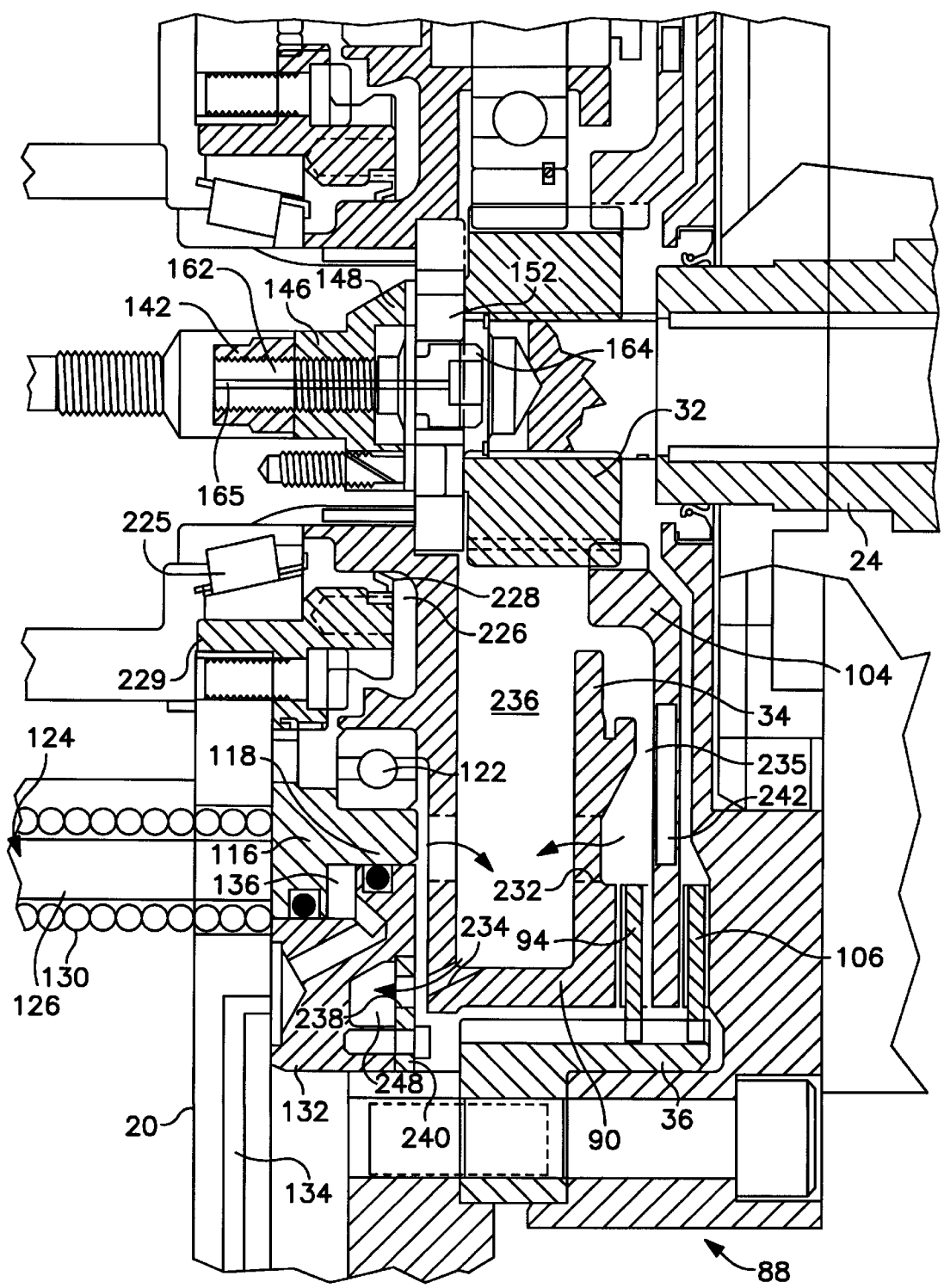
Figure 17:
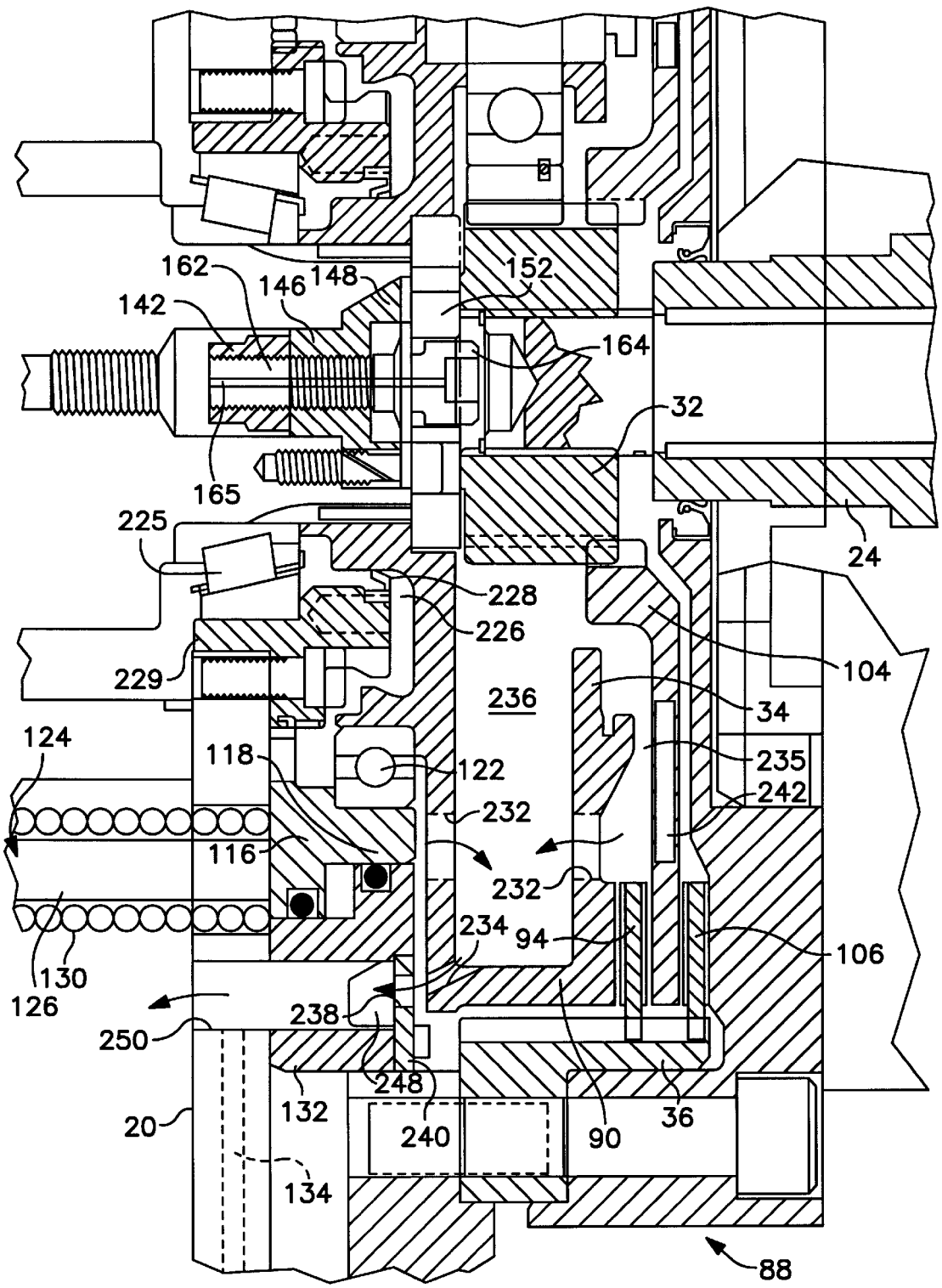

The bucket-like recesses 237 in carrier 34 communicate through a plurality of ports 234 with slots 238 in a cover plate 240. As shown in FIG. 16, cover plate 240 is bolted to the cylindrical body of fluid plate 132. As shown in FIG. 15, fluid plate 132 is nonrotatably bolted to traction case 20. Carrier 34 rotates relative to plate 240 and fluid plate 132. As shown in FIG. 17, cover plate slots 238 communicate with cavity 248 which is vented through holes 250 in plate 132 to holes that extend through the traction case 20.

As shown in FIG. 7, the cover plate slots 238 are positioned in spaced relation on the upper periphery of plate 240 in an arc of approximately 80° above the horizontal center line of input shaft 24. For oil to flow through slots 238 and out of first stage planetary assembly 30, the oil must be picked up and pumped out of brake assembly 88 at elevation above the input shaft 24.

As carrier 34 rotates, oil in bucket cavities 237 is conveyed above the input shaft 24 through cover plate slots 238 and cavity 248 out of slots 250 in the planetary assembly 30 (FIG. 17). In this manner, rotating planetary carrier 34 pumps excess fluid out of brake assembly 88.

As discussed above and illustrated in FIGS. 6 and 16, the cover plate 132 also provides a flow path for fluid to cavity 136 to normally maintain the brake assembly 88 released. Hydraulic fluid line 134 passes through the cover plate 132 and supplies fluid under pressure to cavity 136 to resist the spring force normally acting on pressure plate 116 and carrier 34 to activate the brake assembly 88. In normal operation of the vehicle 10, the assembly 88 is deactivated by fluid supplied through plate 132 to cavity 136. This fluid flow is maintained separate from the fluid flow through plate 132 by the pumping action of carrier 34 to remove excess lubricating fluid from the brake assembly 88.

It should be understood that the number and size of the oil flow passageways described above may be modified to suit the particular needs of a given embodiment. For example, by increasing the number of ports 227 in the bearing carrier 229 leading to the ring cavity 226 the rate of oil flow return is hastened. Conversely, to run the system at an even lower oil level, the number or size of the ports 227 open to ring cavity 226 is reduced to slow the rate of oil flow return.

According to the provisions of the patent statutes, I have explained the principle, preferred construction, and mode of operation of my invention and have illustrated and described what I now consider to represent its best embodiments. However, it should be understood that within the scope of the appended claims the invention may be practiced otherwise than as specifically illustrated and described.

I claim:

1. A disc braking apparatus for a motor driven vehicle comprising, a drive motor, an input shaft connected to said drive motor for rotating said input shaft at a preselected speed, an intermediate drive mechanism drivingly connected to said input shaft to transfer rotation from said input shaft at a modified rate a final drive mechanism drivingly connected to said intermediate drive mechanism to transfer rotation to at least one wheel of said vehicle, and a disc brake assembly connected to said intermediate drive mechanism for applying a braking force to said intermediate drive mechanism to interrupt rotation transferred to said final drive mechanism and brake said vehicle wheel, wherein the intermediate drive mechanism is entirely longitudinally movable relative to the final drive mechanism.

2. A disc braking apparatus for a motor driven vehicle comprising, a drive motor, an input shaft connected to said drive motor for rotating said input shaft at a preselected speed, an intermediate drive mechanism drivingly connected to said input shaft to transfer rotation from said input shaft at a modified rate, a final drive mechanism drivingly connected to said intermediate drive mechanism to transfer rotation to at least one wheel of said vehicle, and a disc brake assembly connected to said intermediate drive mechanism for applying a braking force to said intermediate drive mechanism to interrupt rotation transferred to said final drive mechanism and brake said vehicle wheel, said intermediate drive mechanism includes a planetary assembly having a sun gear connected to said input shaft for transmitting rotation to a planetary carrier, said planetary carrier being longitudinally movable in said planetary assembly and having a braking surface, said disc brake assembly connected to rotate with said sun gear and positioned oppositely of said planetary carrier braking surface, and said planetary carrier being movable relative to said disc brake assembly to apply a braking force through said disc brake assembly to stop rotation of said input shaft and brake the vehicle.

3. A disc braking apparatus for a motor driven vehicle as set forth in claim 2 which includes, said planetary carrier being normally positioned relative to said input shaft removed from applying a braking force on said disc brake assembly by fluid pressure applied to said planetary carrier overcoming an opposing force normally biasing said planetary carrier into frictional engagement with said disc brake assembly.

4. A disc braking apparatus for a motor driven vehicle as set forth in claim 3 which includes, a spring biased pressure plate exerting a force upon said planetary carrier opposing the fluid pressure applied thereto, said input shaft remaining freely rotatable by the fluid pressure resisting displacement of said planetary carrier under the force of said pressure plate, and said input shaft being braked when the force applied by said pressure plate upon said planetary carrier exceeds the fluid pressure acting thereon.

5. A disc braking apparatus for a motor driven vehicle as set forth in claim 1 in which, said disc brake assembly includes a brake plate extending from said input shaft to rotate therewith, a pair of brake discs positioned oppositely of said brake plate for movement into and out of frictional engagement with said brake plate, and said intermediate drive mechanism including a planetary carrier drivingly connected to said input shaft and longitudinally movable to actuate frictional engagement of said pair of brake discs with said brake plate to brake the vehicle.

6. A disc braking apparatus for a motor driven vehicle as set forth in claim 5 in which, said planetary carrier includes a braking surface movable into and out of frictional engagement with one of said pair of brake discs to effect engagement and release of a braking force applied to said input shaft to brake the vehicle.

7. A disc braking apparatus for a motor driven vehicle as set forth in claim 1 which includes, a source of fluid under pressure normally acting on said disc brake assembly to restrain application of a braking force upon said intermediate drive mechanism for the uninterrupted transfer of rotation to said final drive mechanism.

8. A disc braking apparatus for a motor driven vehicle as set forth in claim 7 which includes, a spring actuated member normally applying a force against said disc brake assembly to actuate a braking force and resisted by said fluid under pressure to maintain transfer of rotation to said final drive mechanism, and said spring actuated member exerting a force overcoming said fluid under pressure to displace said disc brake assembly to apply a braking force to stop transfer of rotation to said final drive mechanism and brake said vehicle wheel.

9. A disc braking apparatus for a motor driven vehicle as set forth in claim 1 which includes, spring applied means acting on said intermediate drive mechanism to move said disc brake assembly to apply a braking force on said intermediate drive mechanism to interrupt rotation of said final drive mechanism, and pressurized fluid means acting on said intermediate drive mechanism for resisting the braking force of said spring applied means to maintain said disc brake assembly disengaged from applying the braking force to said intermediate drive mechanism for uninterrupted rotation of said final drive mechanism.

10. A disc braking apparatus for a motor driven vehicle as set forth in claim 9 which includes, means for applying a manual force to said intermediate drive mechanism to longitudinally displace said intermediate drive mechanism and override the braking force applied to said intermediate drive mechanism to allow transfer of uninterrupted rotation to said final drive mechanism.

11. A disc braking apparatus for a motor driven vehicle as set forth in claim 1 which includes, a traction case for housing said disc brake assembly, said traction case forming a cavity surrounding said disc brake assembly, means for supplying fluid under pressure to said cavity to lubricate said disc brake assembly, means for pumping fluid into and out of said cavity to control the volume of fluid in said cavity to prevent an undesirable build up of fluid resulting in a retarding force acting on said intermediate drive mechanism.

12. An underground mining machine comprising, a machine frame, a traction mechanism connected to said machine frame to move said machine frame, a drive motor mounted on said machine frame for driving said traction mechanism, an input drive shaft drivingly connected to said drive motor, a brake plate extending from said input drive shaft to rotate therewith, said input drive shaft being longitudinally movable and rotatably mounted on said machine frame, a planetary carrier drivingly connected to said input drive shaft, a drive mechanism drivingly connected to said planetary carrier for transmitting rotation to said traction means, said planetary carrier being longitudinally movable relative to said input drive shaft, a brake disc assembly mounted adjacent to said planetary carrier for movement into and out of frictional engagement with said brake plate to apply a braking force to said brake plate and interrupt rotation of said input drive shaft to stop movement of said traction, said planetary carrier having a braking surface positioned oppositely of said brake disc assembly, and said planetary carrier being longitudinally movable upon application of a preselected force thereto to move said braking surface into contact with said brake disc assembly and displace said brake disc assembly into frictional engagement with said brake plate to stop rotation of said input drive shaft.

13. An underground mining machine as set forth in claim 12 which includes, a traction case surrounding said planetary carrier and said brake disc assembly, said planetary carrier supported within said traction case for movement of said carrier braking surface into and out of contact with said brake disc assembly, and said traction case forming a cavity to receive fluid under pressure to normally maintain said carrier braking surface removed from contact with said brake disc assembly for uninterrupted rotation of said brake plate and said input drive shaft.

14. An underground mining machine as set forth in claim 13 which includes, a spring applied pressure plate forming a movable portion of said traction case surrounding said planetary carrier, said pressure plate applying a force upon said planetary carrier normally biasing said planetary carrier into contact with said brake disc assembly to apply a braking force on said brake plate, and said fluid under pressure normally maintained in said cavity to restrain displacement of said pressure plate so that said planetary carrier is separated from contact with said brake disc assembly.

15. An underground mining machine as set forth in claim 12 which includes, a traction case forming a cavity for housing said input drive shaft, said brake plate, said planetary carrier, said drive mechanism, and said brake disc assembly, said traction case having an inlet port for supplying fluid to said cavity, said planetary carrier surrounding said brake disc assembly and said brake plate in said traction case, and said planetary carrier having ports therethrough for pumping fluid into and out of said traction case to maintain a preselected volume of fluid in contact with said brake disc assembly for cooling thereof without retarding rotation of said input drive shaft.

16. An underground mining vehicle as set forth in claim 15 in which, said planetary carrier ports maintain a steady state fluid flow though said planetary carrier into and out of said cavity around said brake plate and said brake disc assembly.

17. An underground mining vehicle as set forth in claim 16 in which, said planetary carrier includes a seal surface for receiving a lip seal to seal said carrier ports from a source of fluid flow through said planetary carrier, and said planetary carrier longitudinally movable away from said lip seal to disengage said seal surface from sealed contact with said lip seal to allow fluid flow through said planetary carrier.

18. A method for braking an underground mining vehicle comprising the steps of, mounting a drive motor on a mining machine frame, drivingly connecting the drive motor to an input shaft, drivingly connecting the input shaft through a planetary assembly to a traction device for propelling the vehicle, extending a brake plate from the input shaft to rotate with the input shaft, transmitting rotation from the input shaft to a planetary carrier of the planetary assembly, providing the planetary carrier with a braking surface, positioning the planetary carrier braking surface laterally of the brake plate, positioning a brake disc between the planetary carrier braking surface and the brake plate for movement into and out of frictional engagement with the brake plate, and actuating longitudinal movement of the planetary carrier to move the carrier braking surface into contact with the brake disc to move the brake disc into frictional engagement with the brake plate and interrupt rotation of the brake plate and input shaft to stop movement of the vehicle.

19. A method for braking an underground mining vehicle as set forth in claim 18 which includes, normally restraining longitudinal movement of the planetary carrier into contact with the brake disc to maintain uninterrupted rotation of the brake plate.

20. A method for braking an underground mining vehicle as set forth in claim 19 which includes, applying an external force to the planetary carrier overcoming the force restraining longitudinal movement of the planetary carrier to actuate frictional engagement of the brake disc with the brake plate to brake the vehicle.

\* \* \* \* \*